(12) United States Patent
Hashimoto et al.

(10) Patent No.: US 6,353,465 B1
(45) Date of Patent: Mar. 5, 2002

(54) MOBILE ELECTRONIC EQUIPMENT WITH LIQUID CRYSTAL DISPLAY

(75) Inventors: Fumio Hashimoto; Tsutomu Abe; Masami Tatehana; Yoshiaki Kameyama, all of Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/556,109

(22) Filed: Apr. 21, 2000

(30) Foreign Application Priority Data

Apr. 23, 1999 (JP) .................................. 11-116869

(51) Int. Cl.⁷ .......................................... G02F 1/1333
(52) U.S. Cl. .......................................... 349/58; 349/60
(58) Field of Search ................................ 349/58, 60

(56) References Cited

U.S. PATENT DOCUMENTS 5,936,600 A * 8/1999 Ohashi et al. ............... 349/58
6,064,453 A * 5/2000 Inubushi et al. ............. 349/58

FOREIGN PATENT DOCUMENTS

JP   10-306431   11/1998

\* cited by examiner

*Primary Examiner*—James A. Dudek
(74) *Attorney, Agent, or Firm*—Pearne & Gordon LLP

(57) ABSTRACT

Mobile electronic equipment has a frame portion 8 which is formed in such a manner that the midsection of a side thereof is located at the longest distance from the surface of the liquid crystal display. Since the arched configuration can suppress deformation of the enclosure in comparison with the linear configuration as seen in arched structure of bridges, even when external pressure is applied onto the liquid crystal cover panel 2 or the enclosure cover 3, the enclosure cover 3, especially the midsection of the frame portion on that side resists deformation, and even when the frame portion of the enclosure cover or the liquid crystal display cover panel 2 comes in contact with the liquid crystal display due to deformation, a load applied onto the liquid crystal display upon contact may be reduced and cracks in the liquid crystal display may be prevented.

4 Claims, 6 Drawing Sheets

MOBILE ELECTRONIC EQUIPMENT WITH LIQUID CRYSTAL DISPLAY

BACKGROUND OF THE INVENTION

The present invention relates to an enclosure structure for mobile electronic equipment provided with a liquid crystal display, such as mobile communication equipment or mobile terminals.

Conventionally, as shown in an exploded perspective view of FIG. 7, mobile electronic equipment with a liquid crystal display comprises a liquid crystal display 1, a liquid crystal display cover panel 2, an enclosure cover 3, and enclosure case 4, a liquid crystal display holder 5, a substrate 6, and a dust-tight packing 7, and a cross section taken along line 8—8 of FIG. 7 is shown in FIG. 8.

In a related art as proposed in Japanese Patent Application No.Heil0-306431, an enclosure includes a frame portion of the enclosure cover having the tapered geometry as shown in a cross section in FIG. 9. In this arrangement, even if the external pressure is applied to the liquid crystal display cover panel, the frame portion of the enclosure cover will not come in contact with the liquid crystal display, or even when the edge of the frame portion 8 comes in contact with the liquid crystal display, the edge of the frame portion 8 will not bear locally against the liquid crystal display but receives it with a plane to prevent cracks in the liquid crystal display.

In such a case, the enclosure cover will be deformed by the external pressure applied on the cover panel of the liquid crystal display as shown in FIG. 10 and supported by the peripheral walls of the liquid crystal display holder to effect a reduction of a load applied on the liquid crystal display when the cover panel of the liquid crystal panel or the frame portion of the enclosure cover comes in contact with the liquid crystal display.

However, the structure of the enclosure of the conventional mobile electronic equipment with a liquid crystal display has such disadvantages that in case where deformation of the frame portion of the enclosure cover cannot be supported by the peripheral walls of the liquid crystal holder, or for example in case where it is not possible to provide peripheral walls of the liquid crystal display holder on all the upper, lower, right and left sides of the liquid crystal display, the vicinity of the midsection of the frame portion of the enclosure cover corresponding to the sides having no peripheral wall of the liquid crystal display holder are most susceptible to deformation and thus have more tendency to be cracked in comparison with other sides of the frame of the enclosure cover when external pressure is applied.

SUMMARY OF THE INVENTION

Therefore, the present invention is intended to solve such conventional disadvantages and to provide mobile electronic equipment with a liquid crystal display wherein the structure of the enclosure resists cracks in the liquid crystal display even when external pressure is applied thereon.

In order to solve the problem hitherto described, the present invention proposes mobile electronic equipment with a liquid crystal display wherein the enclosure is constructed in such a manner that the frame portion on at least on one side of the opening formed on the enclosure cover is circular arc in shape so that the midsection of the frame portion on that side is located at the longest distance from the surface of the liquid crystal display.

Thus mobile electronic equipment with a liquid crystal display having such a structure of enclosure that the liquid crystal display resists cracks is provided.

The first aspect of the present invention is mobile electronic equipment with a liquid crystal display comprising a liquid crystal display housed in an enclosure, a liquid crystal display cover panel fitted into an opening provided on the enclosure at the location corresponding to the location of the liquid crystal display to be housed, the opening being provided with on its periphery a frame portion for supporting the liquid crystal display cover panel, and the frame portion having a reduced thickness in its inner portion to make the thickness at the junction with the enclosure cover thicker than that at the inner edge portion, wherein the frame portion on at least one side of the opening is circular arc in shape so that the midsection of the frame portion on that side is located at the longest distance from the surface of the liquid crystal display, and wherein even when external pressure is applied to the liquid crystal display cover panel and the enclosure cover, the enclosure cover, especially the midsection of the frame portion on that side resists deformation, and even if the frame portion of the enclosure cover or the liquid crystal display cover panel comes into contact with the liquid crystal portion due to deformation thereof, it has an effect to reduce a load applied onto the liquid crystal display.

The second aspect of the present invention is mobile electronic equipment characterized in that the enclosure is constructed in such a manner that the circular arc shape of the frame portion according to the first aspect of the invention is defined by the combination of an arc and linear segments, and thus even when external pressure is applied to the liquid crystal display cover panel and the enclosure cover, the enclosure cover, especially the midsection of the frame portion on that side resists deformation, and even if the frame portion of the enclosure cover or the liquid crystal display cover panel comes into contact with the liquid crystal portion due to deformation thereof, it has an effect to reduce a load applied onto the liquid crystal display.

The third aspect of the present invention is mobile electronic equipment with a liquid crystal display characterized in that the enclosure is constructed in such a manner that the circular arc shape of the frame portion according to the first aspect of the invention is defined by the combination of several linear segments to form a pseudo circular arc, and thus even when external pressure is applied to the liquid crystal display cover panel and the enclosure cover, the enclosure cover, especially the midsection of the frame portion on that side resists deformation, and even if the frame portion of the enclosure cover or the liquid crystal display cover panel comes into contact with the liquid crystal portion due to deformation thereof, it has an effect to reduce a load applied onto the liquid crystal display.

The forth aspect of the present invention is mobile electronic equipment according to the first aspect of the present invention characterized in that the enclosure is constructed in such a manner that the circular arc shaped frame portion has a concave shape in the midsection of the side facing the liquid crystal display cover panel, and thus when attaching the liquid crystal display cover panel to the frame portion of the enclosure cover of circular arc in shape by means of a double-faced tape or adhesives, the unstableness or falling-off of the liquid crystal display cover caused by being bonded to the liquid crystal display cover only at the vertex of the circular can be prevented.

DETAILED DESCRIPTION OF THE PREFERRED EMBODIMENTS

Figure 1:
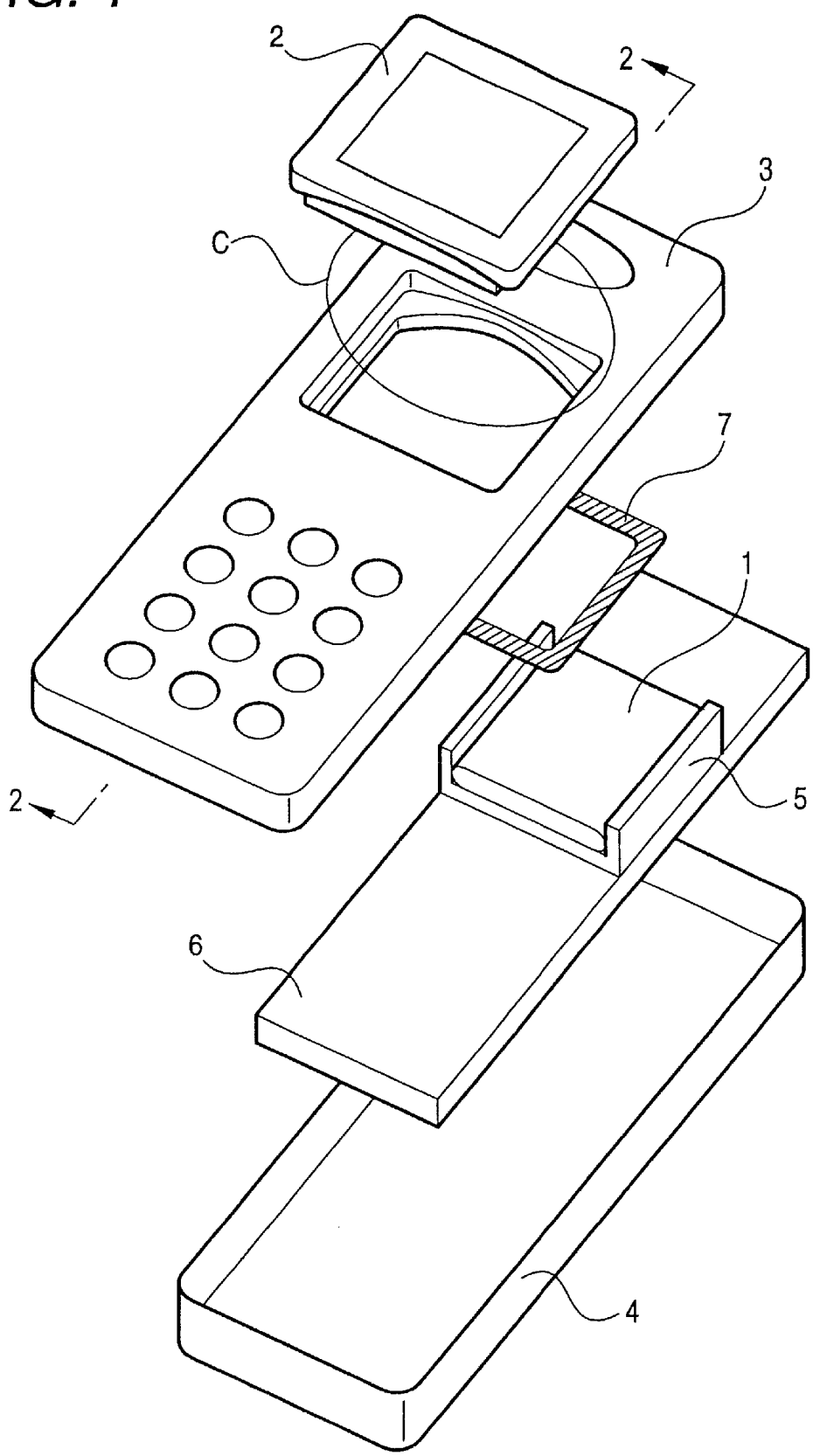
FIG. 1 is an exploded perspective view of mobile electronic equipment according to the first embodiment of the present invention.

Referring now to the drawings from FIG. 1 to FIG. 6, the embodiments of the present invention will be described.

First Embodiment

FIG. 1 illustrates an exploded perspective view of mobile electronic equipment with a liquid crystal display of the first embodiment, comprising a liquid crystal display 1, a liquid crystal display cover panel 2, an enclosure cover 3, an enclosure case 4, a liquid crystal display holder 5, a substrate 6, and a dust-tight packing 7.

Figure 2:
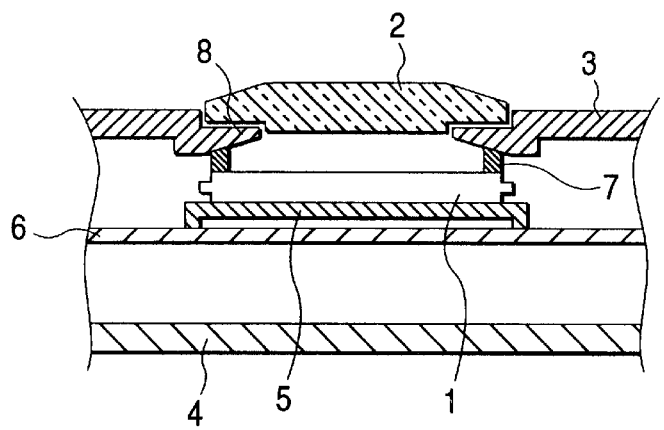
FIG. 2 is a cross sectional view taken along the line 2—2 of mobile electronic equipment shown in FIG. 1.

When the peripheral walls of the liquid crystal display holder are not formed all on the upper, lower, right and left sides, but only on the right and left sides, the cross section taken along the line 2—2 of FIG. 1 will be as shown in FIG. 2. Since peripheral walls of liquid crystal display holder for supporting the frame portion 8 are not provided, a deformation of the frame portion of the enclosure cover cannot be supported.

Figure 3:
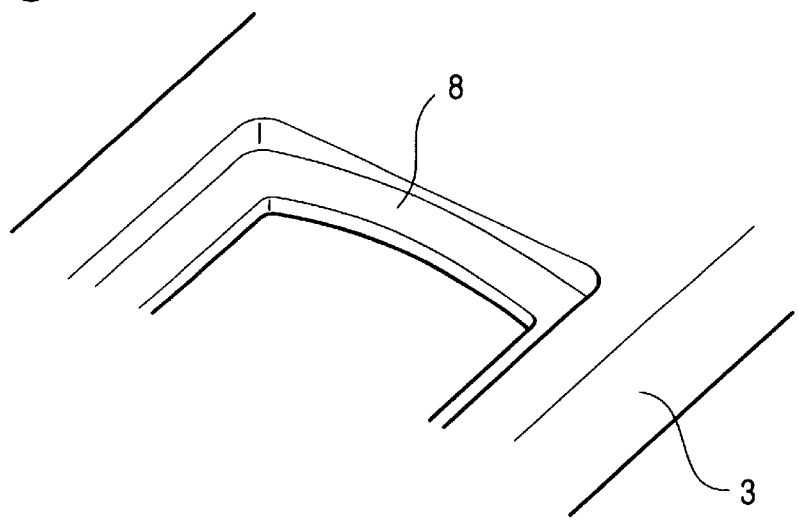
FIG. 3 is an enlarged view of the portion C of mobile electronic equipment shown in FIG. 1.

FIG. 3 is an enlarged view of the portion C in FIG. 1 and a perspective view of the frame portion of the enclosure cover. By forming the frame portion 8 in such a manner that the midsection of a side thereof is located at the longest distance from the surface of the liquid crystal display, since the circular arc configuration can suppress deformation of the enclosure in comparison with the linear configuration as seen in arched structure of bridges, even when external pressure is applied onto the liquid crystal cover panel 2 or the enclosure cover 3, the enclosure cover 3, especially the midsection of the frame portion on that side resists deformation, and even when the frame portion of the enclosure cover or the liquid crystal display cover panel 2 comes in contact with the liquid crystal display due to deformation, a load applied onto the liquid crystal display upon contact may be reduced and cracks in the liquid crystal display may be prevented.

Second Embodiment

Figure 4:
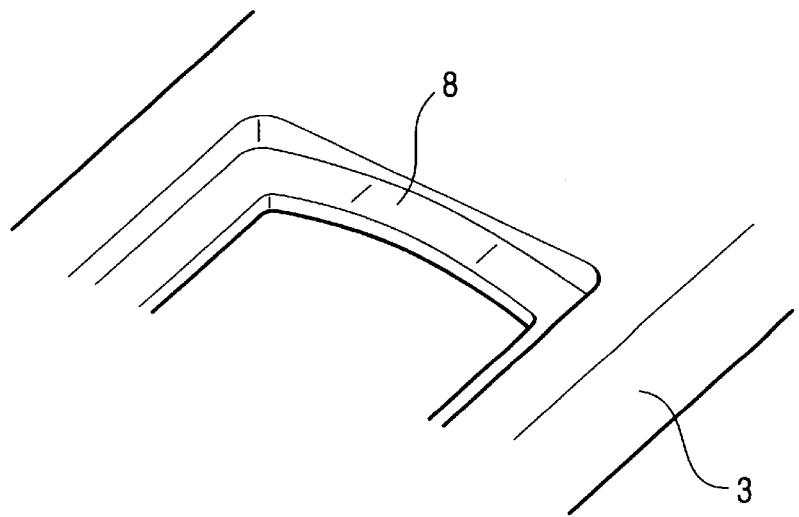
FIG. 4 is a partly enlarged perspective view of the frame portion of the enclosure cover according to the second embodiment of the present invention.

FIG. 4 is a perspective view illustrating the frame portion of the enclosure cover of the second embodiment of the present invention. By forming the frame portion 8 in the shape of circular arc by combining a circular arc and linear sections with the midsection thereof located at the longest distance from the surface of the liquid crystal display, cracks in the liquid crystal display may be prevented.

Third Embodiment

Figure 5:
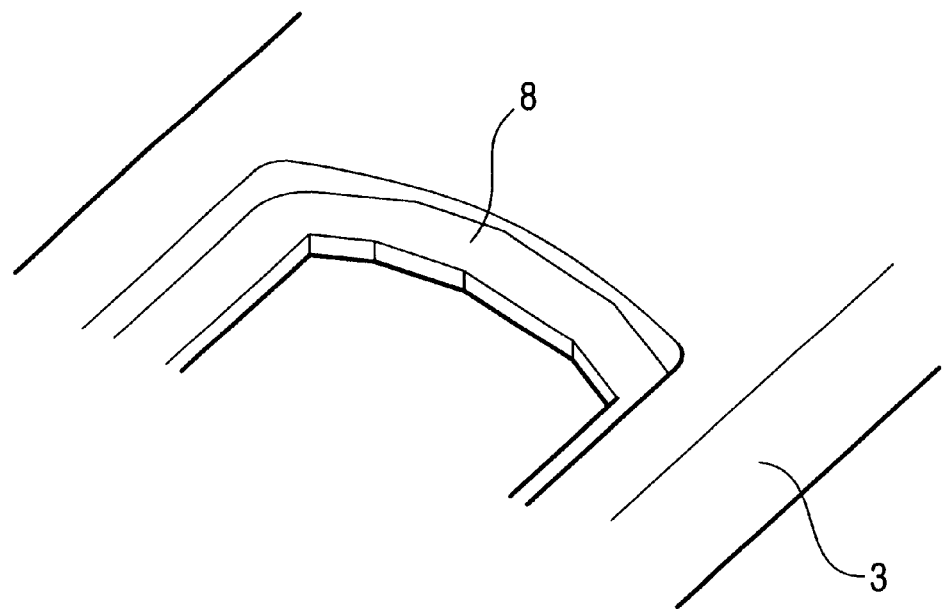
FIG. 5 is a partly enlarged perspective view of the frame portion of the enclosure cover according to the third embodiment of the present invention.

FIG. 5 is a perspective view illustrating the frame portion of the enclosure of the third embodiment of the present invention. By forming the frame portion 8 in the shape of pseudo circular arc by combining several linear sections with the midsection thereof located at the longest distance from the surface of the liquid crystal display, cracks in the liquid crystal display may be prevented.

Fourth Embodiment

Figure 6:
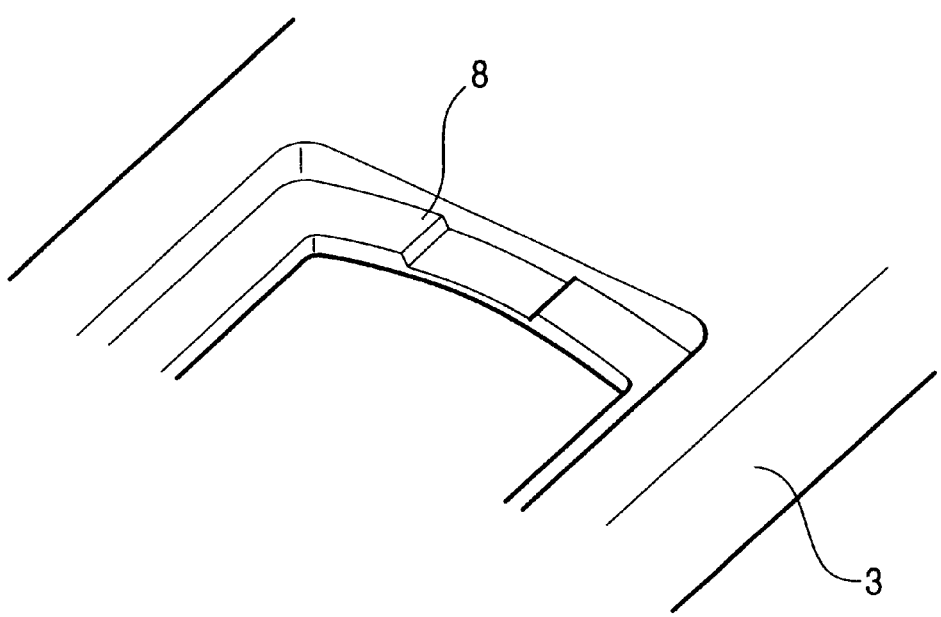
FIG. 6 is a partly enlarged perspective view of the frame portion of the enclosure cover according to the fourth embodiment of the present invention.
Figure 7:
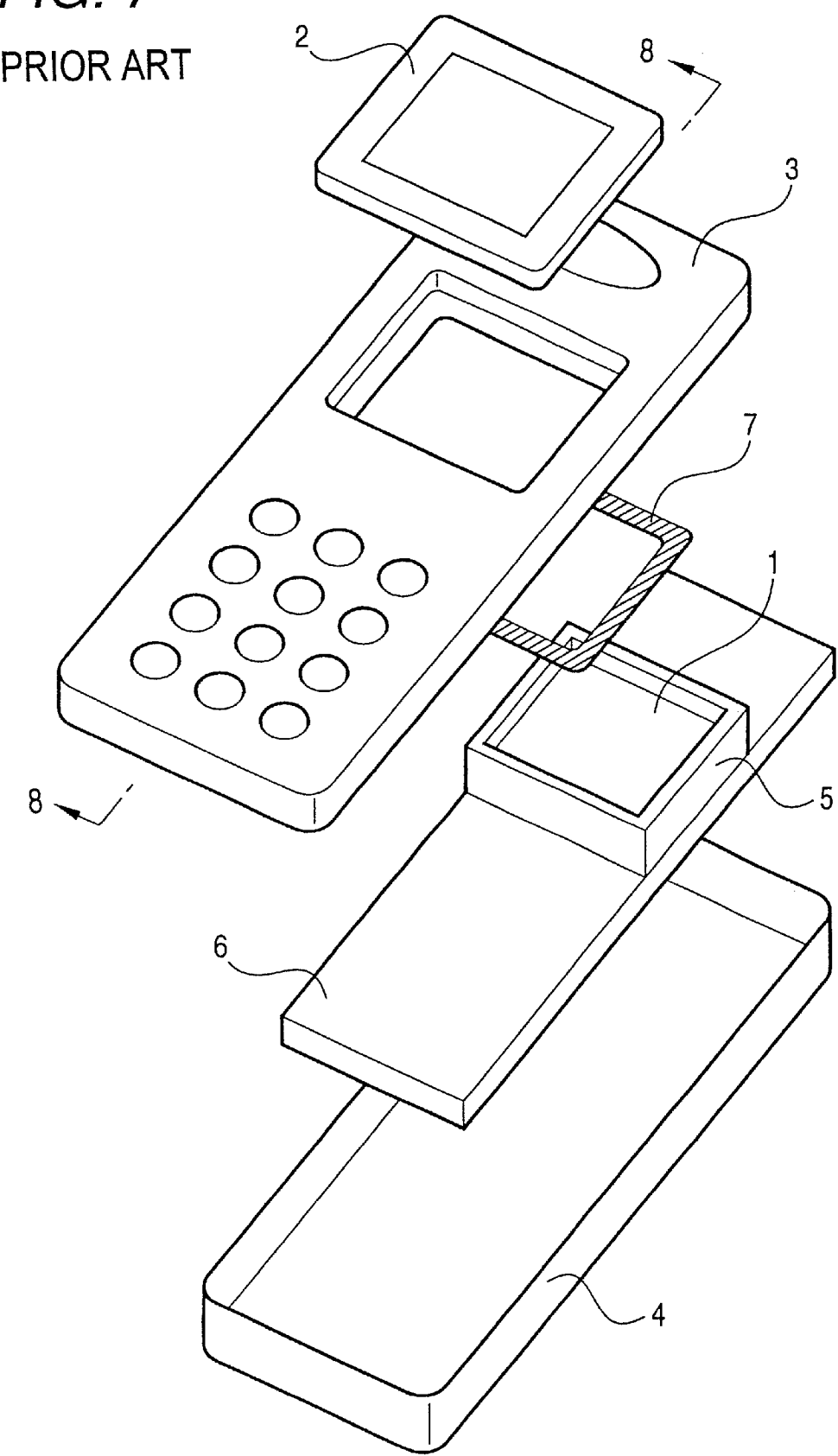
FIG. 7 is an exploded perspective view of the conventional mobile electronic equipment.
Figure 8:
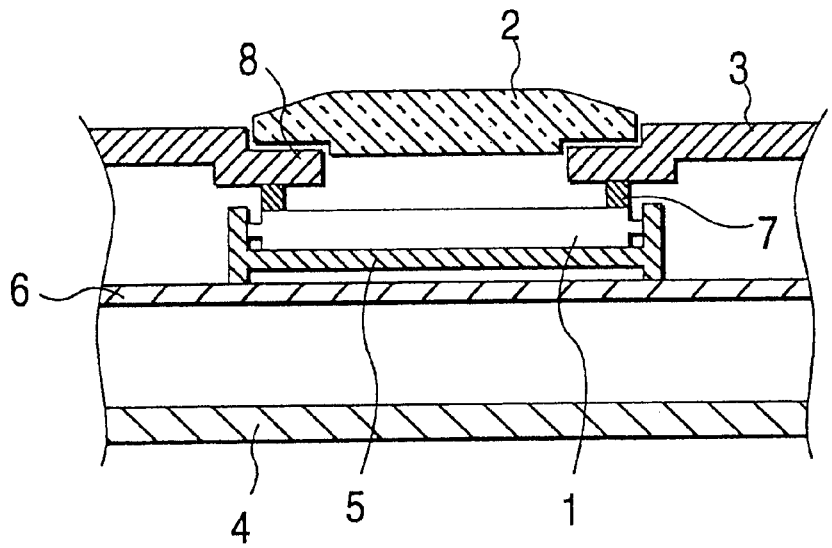
FIG. 8 is a cross sectional view taken along the line 8—8 of mobile electronic equipment shown in FIG. 1.
Figure 9:
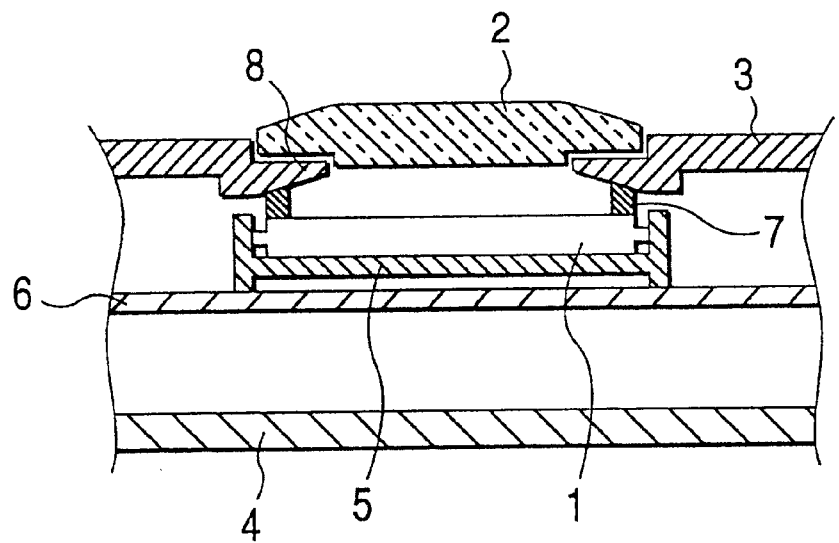
FIG. 9 is a cross sectional view of a mobile electronic equipment with a tapered configuration provided on the frame portion of the enclosure cover, according to a related art.
Figure 10:
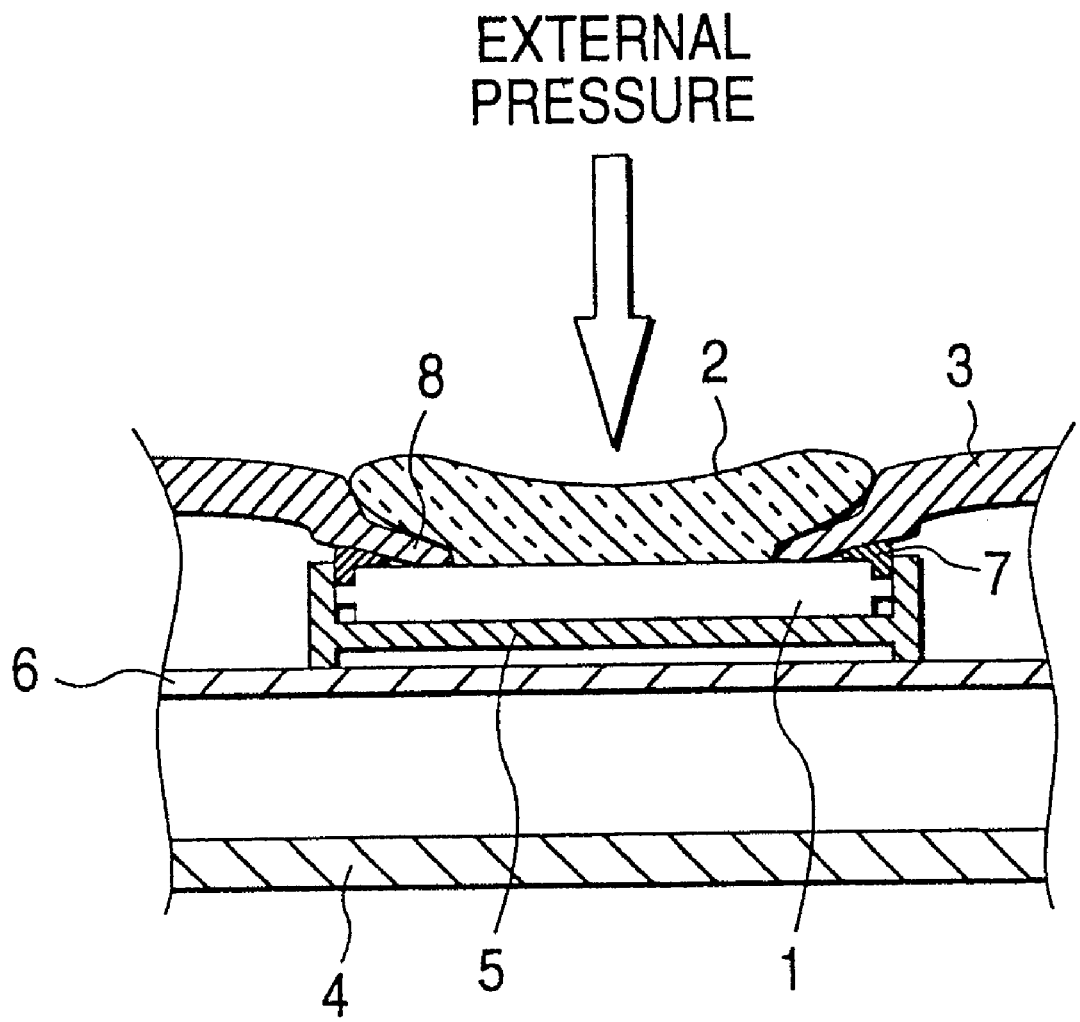
FIG. 10 is a cross sectional view of the mobile electronic equipment of FIG. 9 with external pressure applied.

FIG. 6 is a perspective view illustrating the frame portion of the enclosure of the fourth embodiment of the present invention. By providing the circular arc shaped frame portion 8 having a concave shape in the midsection of the side facing the liquid crystal panel 2, when attaching the liquid crystal panel 2 on the frame portion of the enclosure cover in arc shape by means of a double-faced tape or adhesives, the unstableness or falling-off of the liquid crystal display cover caused by being bonded to the liquid crystal display cover only at the vertex of the circular arc can be prevented.

So far a description is made in relation to the case where peripheral walls of the liquid crystal display holder is provided only on the right and left sides of the liquid crystal display, but not on the upper, lower, right and left sides thereof, however, the case where any one of walls is missing, or the case where walls are provided only on the upper and lower sides thereof are also possible.

As described so far, by providing an enclosure structure having the frame portion on at least a side of the opening of the enclosure cover is circular arc in shape the midsection of the frame portion on that side is located at the longest distance from the surface of the liquid crystal display, there is provided mobile electronic equipment with a liquid crystal display characterized in that even when external pressure is applied on the liquid crystal display cover panel or the enclosure panel, the enclosure cover, especially the midsection of the frame portion on that side resists deformation, and even when the frame portion of the enclosure cover or the liquid crystal display cover panel comes in contact with the liquid crystal display due to deformation, a load applied to the liquid crystal display portion upon contact may be reduced and cracks in the liquid crystal panel may be prevented.

What is claimed is:

1. Mobile electronic equipment with a liquid crystal display comprising:
    a liquid crystal display housed in an enclosure;
    a liquid crystal display cover panel fitted into an opening provided on said enclosure at the location corresponding to the location of said liquid crystal display to be housed;
    a frame portion provided on periphery of said opening, which supports said liquid crystal display cover panel, and said frame portion having a reduced thickness in its inner portion to make the thickness at the junction with said enclosure cover thicker than that of the inner edge portion,
    wherein said enclosure is constructed in such a manner that said frame portion on at least one side of said opening is circular arc in shape so that the midsection of said frame portion on said side is located at the longest distance from the surface of said liquid crystal display.

2. Mobile electronic equipment according to claim 1, wherein said enclosure is constructed in such a manner that the circular arc shape of said frame portion is defined by the combination of an arc and linear segments.

3. Mobile electronic equipment according to claim 1, wherein said enclosure is constructed in such a manner that the circular arc shape of the frame portion is defined by the combination of several linear segments to form a pseudo arc.

4. Mobile electronic equipment according to claim 1, wherein said enclosure is constructed in such a manner that the circular arc shaped frame portion has a concave shape in the midsection of the side facing the liquid crystal display cover panel.

* * * * *